US011208918B2

(12) United States Patent
Sippel et al.

(10) Patent No.: US 11,208,918 B2
(45) Date of Patent: Dec. 28, 2021

(54) TURBINE SHROUD ASSEMBLY WITH CASE CAPTURED SEAL SEGMENT CARRIER

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 75 days.

(21) Appl. No.: 16/685,242

(22) Filed: Nov. 15, 2019

(65) Prior Publication Data
US 2021/0148250 A1    May 20, 2021

(51) Int. Cl.
*F01D 25/24* (2006.01)
*F01D 11/08* (2006.01)
*F01D 9/04* (2006.01)
*F01D 25/12* (2006.01)

(52) U.S. Cl.
CPC ............ *F01D 25/246* (2013.01); *F01D 11/08* (2013.01); *F01D 9/04* (2013.01); *F01D 25/12* (2013.01); *F05D 2220/323* (2013.01); *F05D 2230/64* (2013.01); *F05D 2240/11* (2013.01); *F05D 2240/55* (2013.01); *F05D 2260/30* (2013.01); *F05D 2300/6033* (2013.01)

(58) Field of Classification Search
CPC .......... F01D 11/00; F01D 11/08; F01D 25/14; F01D 25/243; F01D 25/246; F01D 25/265; F05D 2230/64; F05D 2240/11; F05D 2260/31; F05D 2300/6033
See application file for complete search history.

(56) References Cited

U.S. PATENT DOCUMENTS

| | | | | |
|---|---|---|---|---|
| 3,066,911 A * | 12/1962 | Anderson | ............. | F01D 25/246 415/138 |
| 4,251,185 A * | 2/1981 | Karstensen | ............. | F01D 11/18 415/136 |
| 4,786,232 A * | 11/1988 | Davis | ...................... | F01D 11/08 415/138 |
| 5,330,321 A * | 7/1994 | Roberts | ................... | F01D 11/18 415/136 |
| 5,462,403 A * | 10/1995 | Pannone | ................. | F01D 9/042 415/173.1 |
| 5,593,276 A | 1/1997 | Proctor et al. | | |
| 6,821,085 B2 | 11/2004 | Darkins, Jr. et al. | | |
| 6,884,026 B2 | 4/2005 | Glynn et al. | | |
| 7,416,362 B2 | 8/2008 | North | | |
| 9,587,504 B2 | 3/2017 | McCaffrey et al. | | |

(Continued)

*Primary Examiner* — Brian P Wolcott
(74) *Attorney, Agent, or Firm* — Barnes & Thornburg LLP

(57) ABSTRACT

A turbine module includes a turbine rotor assembly, a turbine case, and a turbine shroud assembly. The turbine rotor assembly is mounted to rotate about a central reference axis. The turbine case is spaced radially outward from the turbine rotor assembly circumferentially around the central reference axis. The turbine shroud assembly includes a plurality of turbine shroud segments mounted to the turbine case. Each turbine shroud segment includes a blade track segment that faces the turbine rotor assembly and a carrier mounted to the turbine case.

18 Claims, 3 Drawing Sheets

(56) References Cited

U.S. PATENT DOCUMENTS

| | | |
|---|---|---|
| 9,587,517 B2 | 3/2017 | Vetters et al. |
| 9,863,265 B2 | 1/2018 | Stapleton |
| 9,874,104 B2 | 1/2018 | Shapiro |
| 10,480,337 B2 * | 11/2019 | Vetters ................. F01D 25/246 |
| 2006/0292001 A1 | 12/2006 | Keller et al. |
| 2013/0004306 A1 | 1/2013 | Albers et al. |
| 2017/0002674 A1 * | 1/2017 | Vetters ................. F01D 25/246 |
| 2017/0268366 A1 | 9/2017 | McCaffrey et al. |
| 2018/0291769 A1 | 10/2018 | Vetters et al. |
| 2018/0340440 A1 | 11/2018 | Freeman et al. |

* cited by examiner

TURBINE SHROUD ASSEMBLY WITH CASE CAPTURED SEAL SEGMENT CARRIER

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, attachment of such components can present challenges.

SUMMARY

The present disclosure may comprise one or more of the following features and combinations thereof.

According to an aspect of the present disclosure, a turbine module includes, a turbine rotor assembly mounted to rotate about a central reference axis, a turbine case spaced radially outward from the turbine rotor assembly circumferentially around the central reference axis, and a turbine shroud assembly. The turbine shroud assembly interfaces with the turbine rotor assembly to block gases from flowing around the turbine rotor assembly without interacting with the turbine rotor. The turbine shroud assembly may include a plurality of turbine shroud segments mounted to the turbine case radially between the turbine rotor assembly and the turbine case. Each turbine shroud segment may include a blade track segment comprising ceramic matrix composite materials and that interfaces with the turbine rotor assembly and a carrier mounted to the turbine case and that supports the blade track segment in a predetermined location relative to the turbine rotor.

In some embodiments, the carrier includes a forward carrier section and an aft carrier section. The forward carrier section may include a forward support flange and a forward support panel coupled to the turbine case. The aft carrier section may include an aft support flange and an aft support panel coupled to the turbine case.

In some embodiments, the forward support flange and the aft support flange may be spaced apart axially from one another to define a channel that receives a portion of the blade track segment therebetween. The forward support panel may have a forward edge and the aft panel may have an aft edge spaced axially from the forward edge. An outermost surface of each support panel may be co-radial or flush with one another from the forward edge to the aft edge. In some embodiments, the forward edge extends axially forward past the forward support flange and the aft portion extends axially aft past the aft support flange.

In some embodiments, the turbine case includes a forward case section and an aft case section. The forward case section may have a forward attachment flange and a forward hanger engaged with the forward carrier section. The aft case may have an aft attachment flange and an aft hanger engaged with the aft carrier section.

In some embodiments, the forward attachment flange is engaged with the aft attachment flange to clamp the forward and aft carrier sections together between the forward hanger and the aft hanger and to provide the channel between the forward support flange and the aft support flange.

In some embodiments, the blade track segment includes a shroud arranged radially above the turbine rotor assembly and a mount post that extends radially outward from the shroud and is located in the channel between the forward carrier section and the aft carrier section.

In some embodiments, the turbine shroud segment further includes an attachment pin received in a post aperture that extends axially through the mount post of the blade track segment and into a corresponding forward aperture formed in the forward carrier section and a corresponding aft aperture formed in the aft carrier section.

In some embodiments, the outermost surfaces of the support panels are spaced apart from an inner surface of the turbine case to provide a gap between the turbine case. The carrier and the forward hanger may be formed to include a cooling-air passage that extends axially through the forward hanger and opens toward the gap to provide high-pressure cooling fluid into the gap to bias the carrier radially inward toward the turbine rotor assembly relative to the central reference axis.

In some embodiments, the forward support panel may be formed to include a cooling-air passage that extends radially inward from the gap toward a cavity between the blade track segment and the forward support panel to provide the high pressure cooling fluid into the cavity toward the blade track segment.

In some embodiments, the aft carrier section further includes a support arm spaced radially inward from the forward support panel and that extends axially forward from the aft support flange such that the forward support panel and the support arm are aligned axially and radially offset from one another. The forward support panel and the support arm may be formed to include radially-extending slots that are aligned circumferentially with one another and receive a key to lock the forward and aft carrier sections together.

These and other features of the present disclosure will become more apparent from the following description of the illustrative embodiments.

DETAILED DESCRIPTION OF THE DRAWINGS

Figure 1:
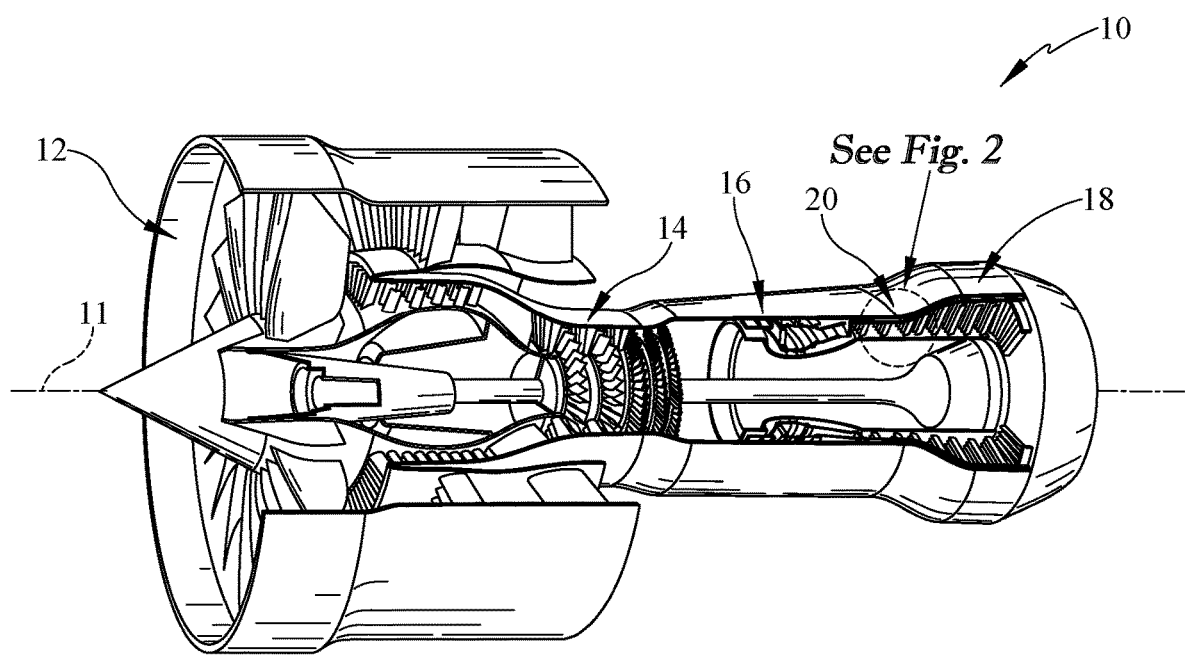
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling a vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central reference axis 11 and drive the compressor 14 and the fan 12.

Figure 2:
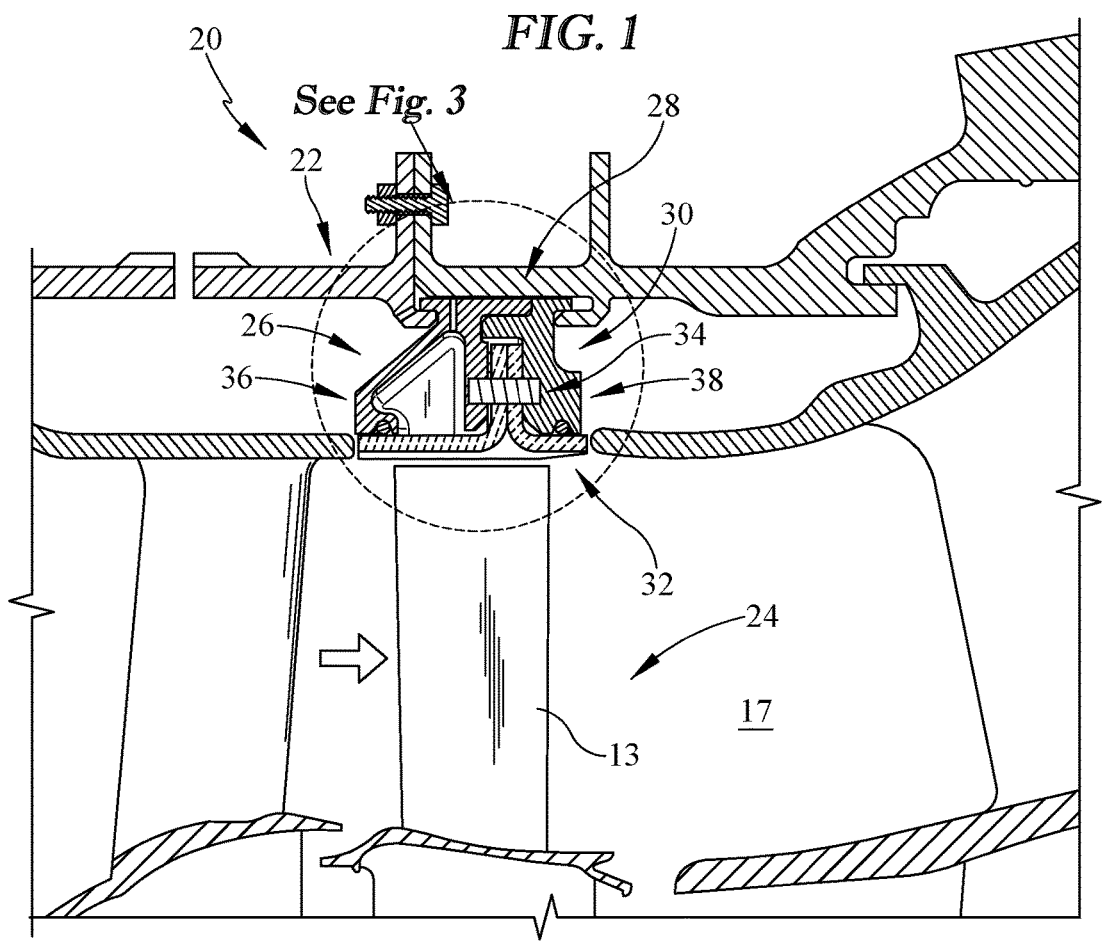
FIG. 2 is a partial cross-sectional view of the gas turbine engine of FIG. 1 showing the arrangement of a turbine module including a turbine shroud assembly radially outward from blades of a turbine rotor assembly to suggest that the turbine shroud assembly blocks gasses from passing over the blades without interacting with the blades.

The turbine 18 has at least one turbine module 20 that includes a turbine case 22, a turbine rotor assembly 24, and a turbine shroud assembly 26 as shown in FIGS. 1 and 2. The turbine case 22 extends circumferentially about the central reference axis 11. The turbine rotor assembly 24 is mounted for rotation about the central reference axis 11 relative to the turbine case 22. The turbine shroud assembly 26 is positioned to surround the turbine rotor assembly 24 radially between the turbine case 22 and the turbine rotor assembly 24.

The turbine rotor assembly 24 includes a plurality of blades 13 coupled to a rotor disk for rotation therewith. In operation, the hot, high pressure combustion products from the combustor 16 are directed toward the blades 13 of the turbine rotor assembly 24 along a flow path 17. The blades 13 are pushed by the combustion products to cause the turbine rotor assembly 24 to rotate; thereby, driving the rotating components of the compressor 14 and/or the fan 12.

Figure 3:
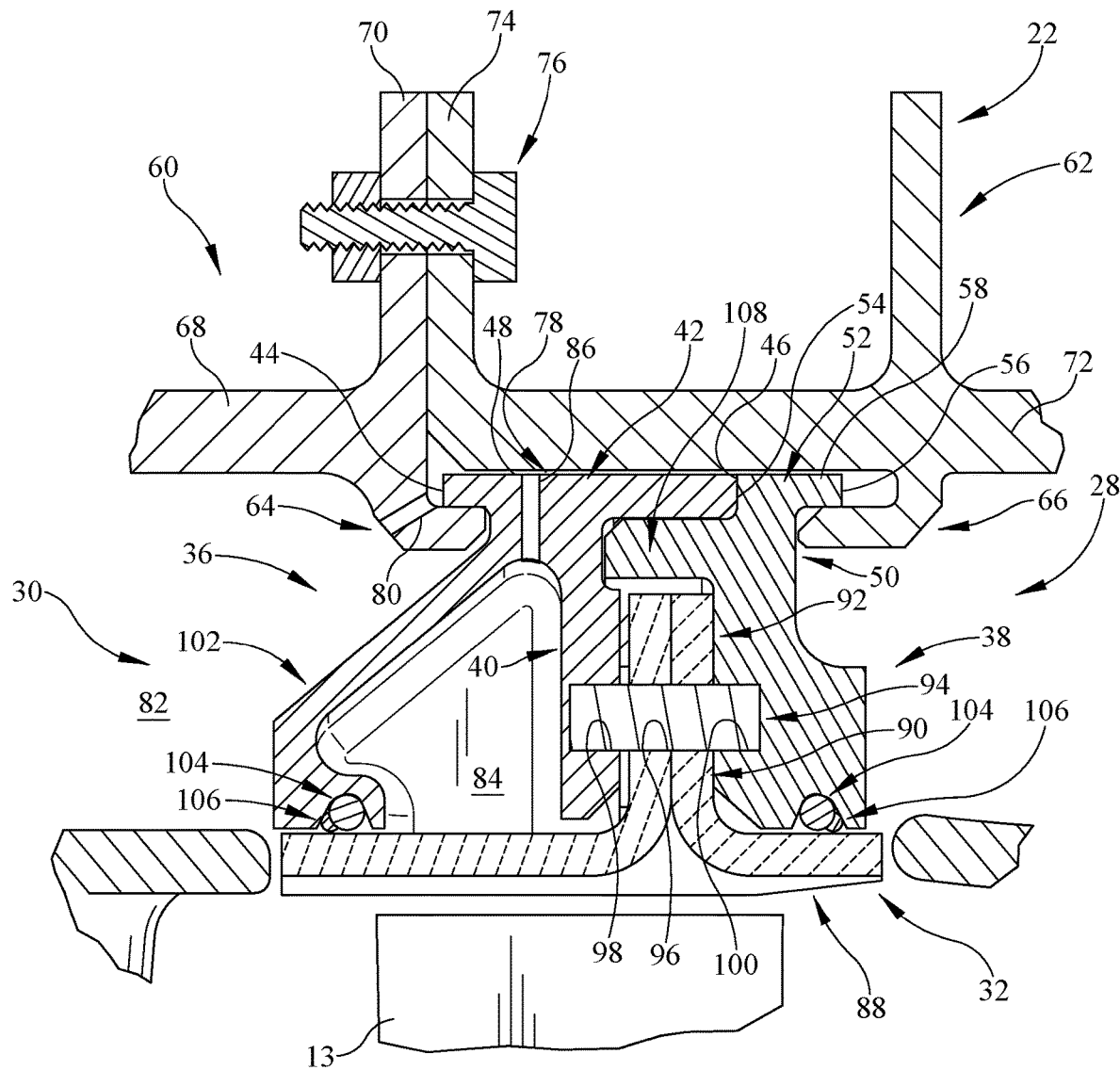
FIG. 3 is a detail view of a portion of FIG. 2 showing that the turbine shroud assembly includes a carrier with a support panel mounted to a turbine case of the gas turbine engine and showing that the support panel of the carrier has a forward ledge and an aft ledge that are co-radial with a central portion of the carrier to minimize a package space of the turbine shroud segment relative to the turbine case and the turbine rotor.
Figure 4:
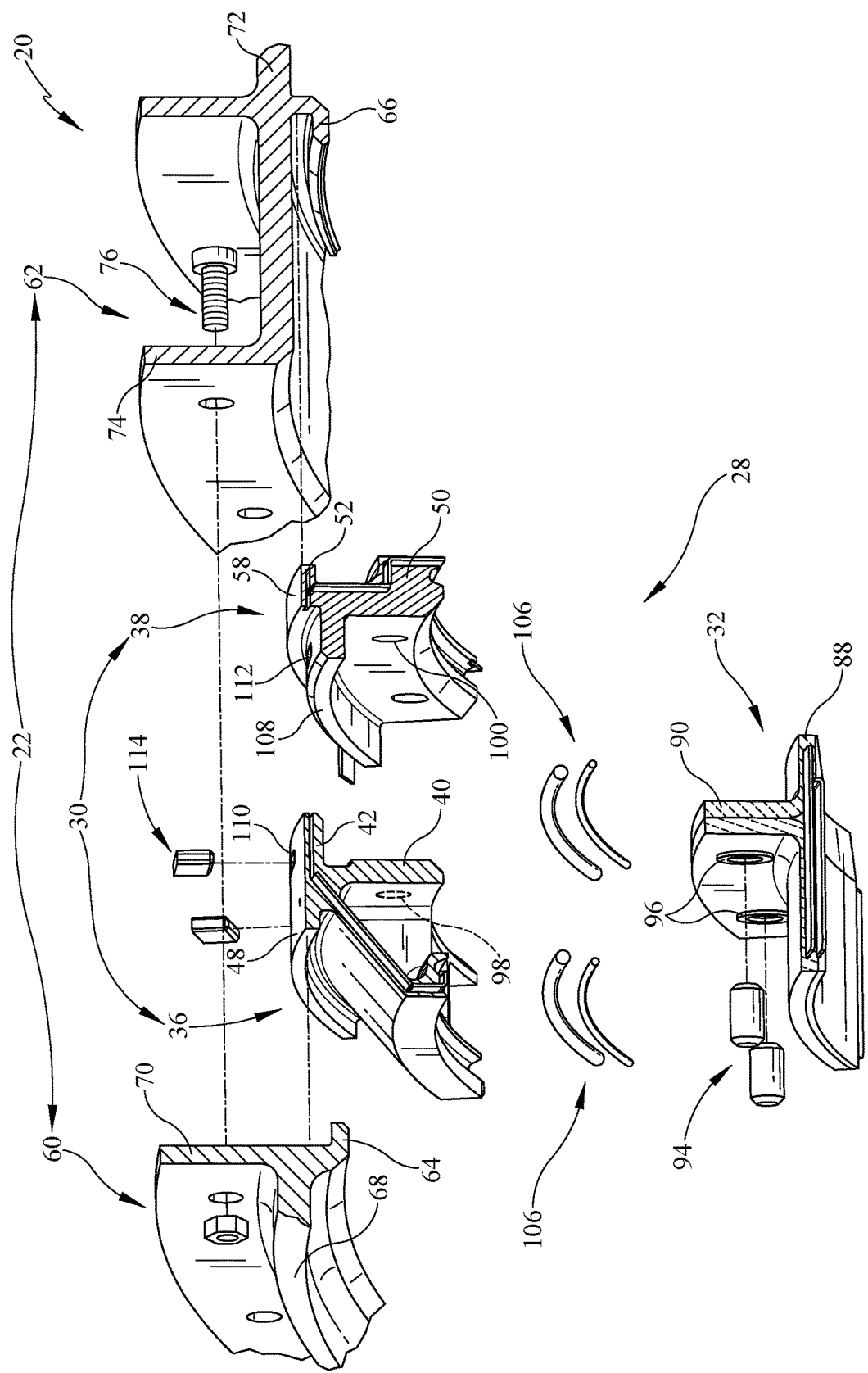
FIG. 4 is an exploded assembly view of the turbine shroud assembly and the turbine case from FIGS. 2 and 3 showing that the turbine case includes a forward segment and an aft segment that combine to clamp and retain the turbine shroud assembly relative to the turbine rotor assembly in the gas turbine engine.

The turbine shroud assembly 26 extends at least partway around the turbine rotor assembly 24 to block combustion products from passing over the blades 13 without pushing the blades 13 to rotate as suggested in FIG. 2. In the illustrative embodiment, the turbine shroud assembly 26 is made up of a number of turbine shroud segments 28, one of which is shown in FIGS. 2-4, that extend only part-way around the central axis 11 and cooperate to surround the turbine rotor assembly 24. The turbine shroud segments 28 are sealed against one another, such as by strip seal members, to provide a continuous turbine shroud assembly 26 around the central reference axis 11. In other embodiments, the turbine shroud assembly 26 is annular and non-segmented to extend fully around the central axis 11 and surround the turbine rotor assembly 24. In yet other embodiments, certain components of the turbine shroud assembly 26 are segmented while other components are annular and non-segmented.

Each turbine shroud segment 28 includes a carrier 30, a blade track segment 32, and a mount system 34 as shown in FIGS. 2-4. The carrier 30 is a metallic component and is coupled with the turbine case 22. The carrier 30 is configured to support the blade track segment 32 in a predetermined position adjacent to the blades 13 of the turbine rotor assembly 24. The blade track segment 32 (also called a seal segment) is positioned directly outward from the rotating blades 13 of the turbine rotor assembly 24. A small clearance gap is provided between a tip of the blades 13 and the blade track segment 32. There could be multiple blade track segments 32 per carrier 30 in other embodiments. The mount system 34 is configured to couple the blade track segment 32 to the carrier 30 such that the blade track segment 32 is properly located relative to the blades 13.

The carrier 30 is sized to minimize a package space of the turbine shroud segment 28 relative to the turbine case 22 and the turbine rotor assembly 24 as shown in FIGS. 2 and 3. The carrier 30 includes a forward carrier section 36 and an aft carrier section 38. The forward carrier section 36 and the aft carrier section cooperate with the turbine case 22 to support the blade track segment 32 in the predetermined position relative to the turbine rotor assembly 24.

The forward carrier section 36 includes a forward support flange 40 and a forward support panel 42 coupled to the turbine case 22 as shown in FIGS. 2 and 3. The forward support flange 40 extends radially inward from the forward support panel 42 toward the turbine rotor assembly 24. The forward support panel 42 extends axially between a forward edge 44 and an aft edge 46 and has an outermost surface 48 that is constant from the forward edge 44 to the aft edge 46. The forward support panel 42 may be arranged generally parallel with the central reference axis 11 or at an angle relative to the central reference axis 11.

The aft carrier section 38 includes an aft support flange 50 and an aft support panel 52 coupled to the turbine case as shown in FIGS. 2 and 3. The aft support flange 50 extends radially inward from the aft support panel 52 toward the turbine rotor assembly 24. The aft support panel 52 extends axially between a forward edge 54 and an aft edge 56 and has an outermost surface 58 that is constant from the forward edge 54 to the aft edge 56. The aft support panel 52 may be arranged generally parallel with the central reference axis 11 or at an angle relative to the central reference axis 11.

In the illustrative embodiment, the forward support panel 42 and the aft support panel 52 directly line the turbine case 22 to minimize the package space of each turbine shroud segment 28 as shown in FIG. 3. The forward support panel 42 and the aft support panel 52 are aligned axially and circumferentially such that they are co-radial relative to the central reference axis 11 and flush relative to one another. The outermost surfaces 48, 58 of the forward support panels 42, 52 follow a contour of the turbine case 22 such that no portions of the carrier 30 extend radially beyond the outermost surfaces 48, 58.

The forward support panel 42 and the aft support panel 52 each engage the turbine case 22 to support the carrier 30 and the blade track segment 32 outward from the turbine rotor assembly 24 as shown in FIG. 3. The forward edge 44 of the forward support panel 42 extends axially forward from the forward support flange 40 and engages with the turbine case 22. The aft edge 56 of the aft support panel 52 extends axially aft away from the aft support flange 50 and engages with the turbine case 22. The aft edge 46 of the forward support panel 42 and the forward edge 54 of the aft support panel 52 directly abut one another.

The aft edge 46 of the forward support panel 42 and the forward edge 54 of the aft support panel 52 are retained in abutment with one another by the turbine case 22 shown in FIGS. 2 and 3. The turbine case 22 includes a forward section 60 and an aft section 62. The forward section 60 includes a forward hanger 64 while aft section 62 includes an aft hanger 66. The forward edge 44 of the forward support panel 42 engages the forward hanger 64 and the aft edge 56 of the aft support panel 52 engages the aft hanger 66 to retain the carrier 30 to the turbine case 22.

The forward section 60 of the turbine case 22 includes a forward case body 68, the forward hanger 64, and a forward attachment bracket 70 as shown in FIG. 3. The forward case body 68 provides an outer boundary for the gas turbine engine 10. The forward hanger 64 extends inwardly from the forward case body 68 relative to the central reference axis 11. The forward attachment bracket 70 extends outwardly from the forward case body 68 relative to the central reference axis 11.

The aft section 62 of the turbine case 22 includes an aft case body 72, the aft hanger 66, and an aft attachment bracket 74 as shown in FIG. 3. The aft case body 72 cooperates with the forward case body 68 to provide the outer boundary of the gas turbine engine 10. The aft hanger 66 extends inwardly from the aft case body 72 relative to the central reference axis 11. The aft attachment bracket 74 extends outwardly from the aft case body 72 relative to the central reference axis 11. During assembly, the forward attachment bracket 70 and the aft attachment bracket 74 are coupled together using a fastener 76 to clamp the carrier 30 between the forward hanger 64 and the aft hanger 66 as shown in FIG. 3 and suggested in FIG. 4.

In the illustrative embodiment, the outermost surfaces 48, 58 of the forward support panel 42 and the aft support panel 52 are spaced apart from an inner surface of the turbine case 22 to provide a gap 78 between the turbine case 22 and the carrier 30. The gap 78 is constant and extends uninterrupted from the forward edge 44 of the forward support panel 42 to the aft edge 56 of the aft support panel 52. The forward hanger 64 is formed to include a cooling-air passage 80 that extends from a plenum 82 towards the gap 78. The cooling-air passage 80 conducts a cooling fluid from the plenum 82 towards the gap 78. The cooling fluid provides a higher pressure in the gap 78 compared to a cavity 84 inward from the forward support panel 42 to bias the carrier 30 inward relative to the central reference axis 11. The gap 78 also provides burn through protection for the turbine case 22.

In the illustrative embodiment, the forward carrier section 36 further includes an arm 102 arranged axially forward from the forward support flange 40 as shown in FIG. 3. The arm 102 and the forward support flange 40 define the cavity 84 axially therebetween. The forward support panel 42 of the carrier 30 is formed to include a cooling-air passage 86 that extends between the gap 78 and the cavity 84. The high pressure cooling fluid is conducted radially inward toward the blade track segment 32 through the cooling-air passage 86. The cooling fluid is configured to cooling portions of the carrier 30, the blade track segment 32, and the mount system 34 so that the high operating temperatures of the gas turbine engine 10 do not damage those components.

In the illustrative embodiment, the blade track segment 32 is made from ceramic-matrix composite materials that are adapted to withstand high temperatures. In other embodiments metallic or another suitable material may be used. The blade track segment 32 includes a shroud segment 88 and a mount post 90. The shroud segment 88 extends circumferentially partway about the axis 11 to define a portion of the gas path 17. The mount post 90 extends outward from the shroud segment 88 toward the support panels 42, 52 of the carrier 30. The shroud segment 88 and the mount post 90 are integrally formed to provide a single, one-piece component 32.

The forward support flange 40 and the aft support flange 50 are spaced apart axially from one another to define a channel 92 therebetween as shown in FIG. 3. The mount post 90 of the blade track segment 32 extends into the channel 92 where it is engaged by the mount system 34 and clamped by the forward support flange 40 and the aft support flange 50. The mount system 34 includes an attachment pin 94 received in a post aperture 96 that extends axially through the mount post 90 of the blade track segment 32. The attachment pin 94 also extends into a corresponding forward aperture 98 formed in the forward support flange 40 and a corresponding aft aperture 100 formed in the aft support flange 50 to retain the blade track segment 32 to the carrier 30 radially outward from the blades 13. The forward and aft apertures 98, 100 are blind holes in the illustrative embodiment, however, in other embodiments, the apertures 98, 100 may extend all the way through the support flanges 40, 50.

In the illustrative embodiment, the aft support panel 52 and the arm 102 are formed to include channels 104 that open radially inward toward the shroud segment 88. Tandem seals 106 are arranged radially between the carrier 30 and the blade track segment 32 in the channels 104 such that they block the flow of gasses between the carrier 30 and the blade track segment 32. The tandem seals 106 extend circumferentially along the carrier 30 and the blade track segment 32.

The aft carrier section 38 further includes a support arm 108 spaced radially inward from the forward support panel 42 of the forward carrier section 36 as shown in FIGS. 3 and 4. The support arm 108 extends axially forward from the aft support flange 50 of the aft carrier section 38. The forward support panel 42 of the forward carrier section 36 and the support arm 108 are radially offset from one another but overlap so that they are aligned axially. The forward support panel 42 is formed to include at least one radially-extending slot 110 as shown in FIG. 4. The support arm 108 is formed to include a radially-extending slot 112 that is aligned circumferentially with the radially-extending slot 110 of the forward support panel 42. Each radially-extending slot 110, 112 receives a key 114 to lock the forward and aft carrier sections 36, 38 together. The key 114 may lock the forward carrier section 36 and the aft carrier section 38 together such that the forward case section 60 and the aft case section 62 do not clamp the forward carrier section 36 and the aft carrier section 38 together.

In some embodiments, one challenge that exists is space claim in a gas turbine engine. Typically, radial space claim for a high-pressure seal segment (i.e. blade track segment 32) is a set of defined boundaries. The inner boundary or flow path definition may be set for aero and performance. The outer boundary (i.e. the casing inner diameter) may be set to minimize overall engine size and weight. Fitting the seal segment and carrier designs into this tight radial space may be challenging.

In some embodiments, the sizes of features in ceramic matrix composite (CMC) high-pressure seal segments (HPSS) are often larger than metallic counterparts. Wall thickness and bend radii on a CMC segment among other features can all contribute to a radially taller component. For these reasons a different interface between the carriers and cases may help create more radial space for the CMC HPSS.

In some embodiments, the carrier hooks (i.e. support panels 42, 52) interface with the cases. In this configuration the carrier hooks or oriented away from each other. In some embodiments, the carrier is attached to a single case. In the illustrative embodiment, the carrier can be radially supported by two cases (i.e. segments 60, 62). In addition, the flanges of the cases may be used as tip clearance control towers for cooling the case and those towers are still aligned with the carrier hooks for optimal control of the segment tip clearance to the blade.

In some embodiments, the radial space claim for the segment can be improved by extending the carrier hooks axially (instead of radially) away from the rest of the carrier body. In some embodiments, this can add about 3-4 mm of additional radial space for the CMC HPSS.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine module comprising
  a turbine rotor assembly mounted to rotate about a central reference axis,
  a turbine case spaced radially outward from the turbine rotor assembly circumferentially around the central reference axis, and
  a turbine shroud assembly that interfaces with the turbine rotor assembly to block gases from flowing around the turbine rotor assembly without interacting with the turbine rotor, the turbine shroud assembly comprising a plurality of turbine shroud segments mounted to the turbine case radially between the turbine rotor assembly and the turbine case, each turbine shroud segment including a blade track segment comprising ceramic matrix composite materials and that interfaces with the turbine rotor assembly and a carrier mounted to the turbine case and that supports the blade track segment in a predetermined location relative to the turbine rotor,
  wherein the carrier includes a forward carrier section and an aft carrier section, the forward carrier section including a forward support flange and a forward support panel coupled to the turbine case, the aft carrier section including an aft support flange and an aft support panel coupled to the turbine case, the forward support flange and the aft support flange spaced apart axially from one another to define a channel that receives a portion of the blade track segment therebetween, the forward support panel having a forward edge and the aft panel having an aft edge spaced axially from the forward edge, and wherein an outermost surface of each support panel is co-radial with one another from the forward edge to the aft edge,
  wherein the aft carrier section further includes a support arm spaced radially inward from the forward support panel and that extends axially forward from the aft support flange such that the forward support panel and the support arm are aligned axially and radially offset from one another.

2. The turbine module of claim 1, wherein the turbine case includes a forward case section and an aft case section, the forward case section having a forward attachment flange and a forward hanger engaged with the forward carrier section, and the aft case having an aft attachment flange and an aft hanger engaged with the aft carrier section.

3. The turbine module of claim 2, wherein the forward attachment flange is engaged with the aft attachment flange to clamp the forward and aft carrier sections together between the forward hanger and the aft hanger and to provide the channel between the forward support flange and the aft support flange.

4. The turbine module of claim 3, wherein the blade track segment includes a blade track shroud arranged radially above the turbine rotor assembly and a mount post that extends radially outward from the blade track shroud and is located in the channel between the forward carrier section and the aft carrier section.

5. The turbine module of claim 4, wherein the turbine shroud segment further includes an attachment pin received in a post aperture that extends axially through the mount post of the blade track segment and into a corresponding forward aperture formed in the forward carrier section and a corresponding aft aperture formed in the aft carrier section.

6. The turbine module of claim 2, wherein the outermost surfaces of the support panels are spaced apart from an inner surface of the turbine case to provide a gap between the turbine case and the carrier and the forward hanger is formed to include a cooling-air passage that extends axially through the forward hanger and opens toward the gap to provide high-pressure cooling fluid into the gap to bias the carrier radially inward toward the turbine rotor assembly relative to the central reference axis.

7. The turbine module of claim 6, wherein the forward support panel is formed to include a cooling-air passage that extends radially inward from the gap toward a cavity between the blade track segment and the forward support panel to provide the high pressure cooling fluid into the cavity toward the blade track segment.

8. The turbine module of claim 1, wherein the forward support panel and the support arm are each formed to include radially-extending slots that are aligned circumferentially with one another and receive a key to lock the forward and aft carrier sections together.

9. The turbine module of claim 1, wherein the forward edge extends axially forward past the forward support flange and the aft edge extends axially aft past the aft support flange.

10. A turbine module comprising
  a turbine rotor assembly mounted to rotate about a central reference axis,
  a turbine case spaced radially outward from the turbine rotor assembly circumferentially around the central reference axis, and
  a turbine shroud assembly comprising a plurality of turbine shroud segments mounted to the turbine case, each turbine shroud segment including a blade track segment and a carrier directly mounted to the turbine case,
  wherein the carrier includes a forward carrier section with a forward support panel coupled to the turbine case and an aft carrier section with an aft support panel coupled to the turbine case, the forward support panel having a forward edge and the aft panel having an aft edge spaced axially from the forward edge, and wherein an outermost surface of each support panel is flush with one another from the forward edge to the aft edge, wherein the outermost surfaces of the support panels are spaced apart from an inner surface of the turbine case to provide a gap between the turbine case and the carrier and the forward hanger is formed to include a cooling-air passage that extends axially through the forward hanger and opens toward the gap to provide high-pressure cooling fluid into the gap to bias the carrier radially inward toward the turbine rotor assembly relative to the central reference axis.

11. The turbine module of claim 10, wherein the turbine case includes a forward case section and an aft case section, the forward case section having a forward attachment flange and a forward hanger engaged with the forward carrier section, and the aft case having an aft attachment flange and an aft hanger engaged with the aft carrier section.

12. The turbine module of claim 11, wherein the forward attachment flange is engaged with the aft attachment flange to clamp the forward and aft carrier sections together between the forward hanger and the aft hanger.

13. The turbine module of claim 12, wherein the forward carrier section further includes a forward support flange that extends radially inward from the forward support panel and the aft carrier section further includes a aft support flange that extends radially inward from the aft support panel to provide a channel between the forward support flange and the aft support flange.

14. The turbine module of claim 13, wherein the blade track segment includes a blade track shroud arranged radially above the turbine rotor assembly and a mount post that extends radially outward from the blade track shroud and is located in the channel between the forward carrier section and the aft carrier section.

15. The turbine module of claim 14, wherein the turbine shroud segment further includes an attachment pin received in a post aperture that extends axially through the mount post of the blade track segment and into a corresponding forward aperture formed in the forward carrier section and a corresponding aft aperture formed in the aft carrier section.

16. The turbine module of claim 10, wherein the forward support panel is formed to include a cooling-air passage that extends radially inward from the gap toward a cavity between the blade track segment and the forward support panel to provide the high pressure cooling fluid into the cavity toward the blade track segment.

17. A turbine module comprising
a turbine rotor assembly mounted to rotate about a central reference axis,
a turbine case spaced radially outward from the turbine rotor assembly circumferentially around the central reference axis, and
a turbine shroud assembly comprising a plurality of turbine shroud segments mounted to the turbine case, each turbine shroud segment including a blade track segment and a carrier directly mounted to the turbine case,
wherein the carrier includes a forward carrier section with a forward support panel coupled to the turbine case and an aft carrier section with an aft support panel coupled to the turbine case, the forward support panel having a forward edge and the aft panel having an aft edge spaced axially from the forward edge, and wherein an outermost surface of each support panel is flush with one another from the forward edge to the aft edge,
wherein the turbine case includes a forward case section and an aft case section, the forward case section having a forward attachment flange and a forward hanger engaged with the forward carrier section, and the aft case having an aft attachment flange and an aft hanger engaged with the aft carrier section,
wherein the forward attachment flange is engaged with the aft attachment flange to clamp the forward and aft carrier sections together between the forward hanger and the aft hanger,
wherein the forward carrier section further includes a forward support flange that extends radially inward from the forward support panel and the aft carrier section further includes a aft support flange that extends radially inward from the aft support panel to provide a channel between the forward support flange and the aft support flange, and
wherein the aft carrier section further includes a support arm spaced radially inward from the forward support panel and that extends axially forward from the aft support flange such that the forward support panel and the support arm are aligned axially and radially offset from one another.

18. The turbine module of claim 17, wherein the forward support panel and the support arm are each formed to include radially-extending slots that are aligned circumferentially with one another and receive a key to lock the forward and aft carrier sections together.

* * * * *